E. J. BRYAN.
MEASURING TANK.
APPLICATION FILED MAY 21, 1914.
1,172,424.
Patented Feb. 22, 1916.
2 SHEETS—SHEET 1.
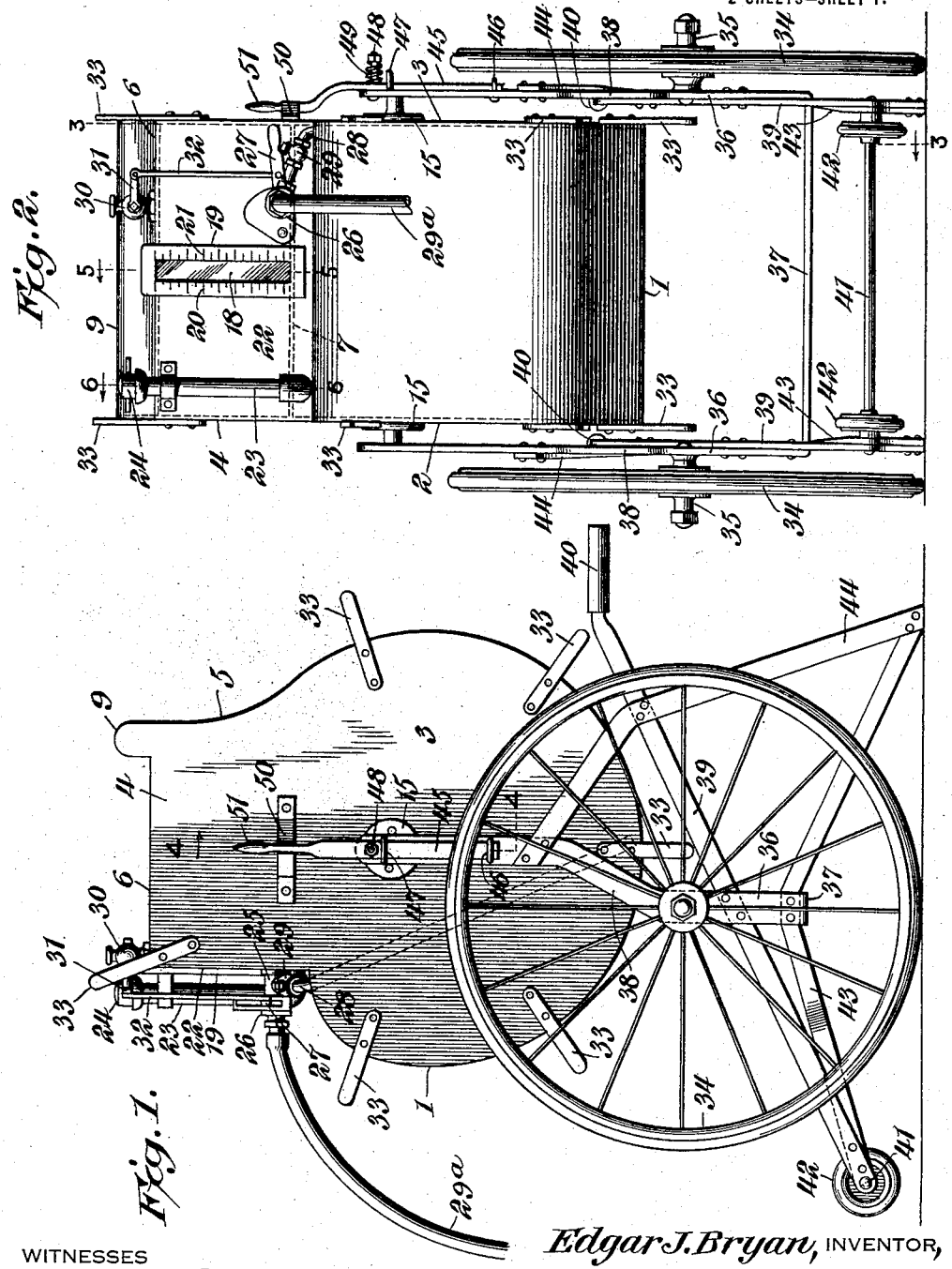
WITNESSES
Howard D. Orr.
F. T. Chapman.
Edgar J. Bryan, INVENTOR,
BY E. G. Siggers
ATTORNEY

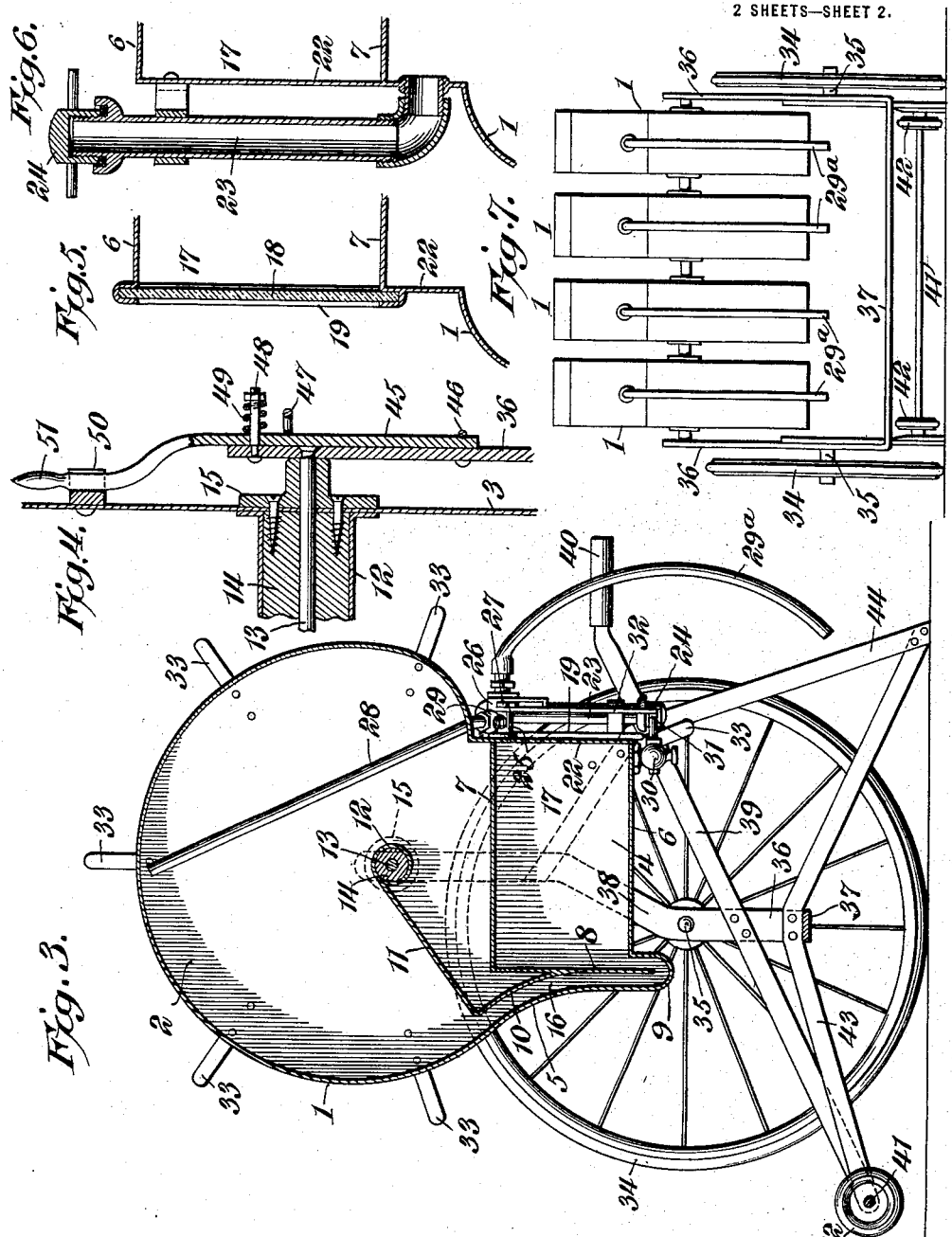

UNITED STATES PATENT OFFICE.

EDGAR J. BRYAN, OF RIVERSIDE, CALIFORNIA, ASSIGNOR OF ONE-HALF TO WILLIAM THOMPSON, OF RIVERSIDE, CALIFORNIA.

MEASURING-TANK.

1,172,424.  Specification of Letters Patent.  Patented Feb. 22, 1916.

Application filed May 21, 1914.  Serial No. 840,079.

*To all whom it may concern:*

Be it known that I, EDGAR J. BRYAN, a citizen of the United States, residing at Riverside, in the county of Riverside and State of California, have invented a new and useful Measuring-Tank, of which the following is a specification.

This invention has reference to improvements in measuring tanks, and is designed more particularly to provide a tank which may be readily moved to position whereby a measured quantity of a commodity is caused to flow into a measuring receptacle and will remain therein when the device is returned to the initial position, at which point the receptacle is high enough for the gravitating of the commodity to the point of utilization.

The present invention is designed more particularly for portability, and while not confined in use to any particular commodity, is especially valuable for supplying measured quantities of gasolene to the gasolene reservoirs of automobiles. For this purpose there is provided a tank of suitable capacity mounted upon a truck in such manner that the tank may be wholly or partially rotated upon a horizontal axis, while at one side of the axis of the supply tank there is provided a measuring receptacle permanently connected to the supply tank in a manner whereby on the rocking of the tank to bring the receptacle lowermost the gasolene or other liquid in the supply tank will flow by gravity into the measuring receptacle until the latter is full. On the return of the receptacle to the uppermost position the liquid deposited therein does not flow out therefrom but remains within the receptacle to be drawn therefrom as desired through a suitably valved outlet. Provision is made for holding the supply tank with the receptacle uppermost and for facilitating both the inflow of liquid into the receptacle and the outflow of liquid therefrom. Furthermore, the receptacle is provided with a gage which is suitably graduated to give evidence of the amount of liquid within the receptacle, and the graduations may be such that both the total amount of liquid within the receptacle before some is drawn off and the amount drawn off at any time is readily ascertained.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a side elevation of the structure of the present invention showing the parts in the normal or upright position. Fig. 2 is a front elevation of the structure of Fig. 1. Fig. 3 is a section on the line 3—3 of Fig. 2, but showing the tank inverted. Fig. 4 is a section on the line 4—4 of Fig. 1, but drawn on a larger scale. Fig. 5 is a detail section on the line 5—5 of Fig. 2, but drawn on a larger scale. Fig. 6 is a detail section on the line 6—6 of Fig. 2, but drawn on a larger scale. Fig. 7 is a more or less schematic front elevation of a multiple tank arrangement, embodying the present invention.

Referring to the drawings, there is shown a tank 1 approaching a cylinder in form, and provided with ends or heads 2, 3, respectively.

The general cylindrical form of the tank is not at all obligatory, but is advisable because of the inherent strength and rigidity of such a construction. Extending in a general radial direction from the main body of the tank 1 is a continuation 4 as wide as the axial length of the tank and of appropriate radial length. One end wall 5 of the continuation 4 may be reversely curved to the general cylindrical form of the tank and merge thereinto, while the continuation has an outer end wall 6 shown as substantially parallel to a tangent of the cylindrical wall of the tank. Inside of the continuation 4 is another wall 7 shown as substantially parallel to the wall 6 and spaced therefrom toward the main body of the tank, and from one end of the wall 7 is another wall 8 extended toward the wall 6 at approximately right angles to the wall 7 and entering a return portion 9 of the wall 5, but the end of the wall 8 is spaced a short distance from the rounded intermediate or yoke portion of the wall 9. The wall 22 opposite the wall 8 completes the continuation 4. There is also provided another wall 10 continued from the wall 8 in substantial parallelism with the wall 5 and the wall 10 merges into a wall 11 tangent to and joining a sleeve 12 fast to the end walls 2 and 3.

The sleeve 12 is traversed by an axle 13 mounted in a filling block 14 within the sleeve 12 and the axle in turn extends through head plates 15 exterior to the walls 2 and 3 and made fast to the block 14. The axle 13 is suitably mounted in a manner to be described, and the whole tank is capable of rotating thereabout. The sleeve 12 and axle 13 are displaced with relation to the center of the body of the tank toward the continuation 4, so that the main body of the tank is eccentric to the axle.

The walls 5, 8 and 10 define a passageway 16 entering the return portion 9 and extending about the corresponding end of the wall 8 and ultimately entering the space between the walls 6, 7, 8 and 22, which space defines a receptacle 17.

The tank 1 is of any suitable capacity and constitutes a reservoir for the reception of gasolene or other liquid.

Because the device is intended more particularly for the ready introduction of gasolene into the reservoirs of automobiles, it will be hereinafter considered for convenience of description that the tank 1 is a gasolene receptacle, although, as will also hereinafter appear, it may be employed for the reception and transportation of lubricating oils or other liquids.

In the wall 22 of the receptacle 17 there is an opening closed by a window 18, which window may be made of glass surrounded by a frame 19, which for convenience is made quite narrow and quite long, while the margins of the frame have graduations 20, 21, which graduations may be arranged to read in opposite directions, so that when the receptacle has gasolene therein the graduations on one side, say, the graduations 20, will indicate the number of units, say, gallons, of gasolene in the receptacle, while on the other side the graduations 21 may read in the opposite direction, thus readily indicating the number of units, say, gallons, of gasolene taken out from this receptacle, which extraction of gasolene may be brought about in the manner to be described. This wall also carries an inlet tube or pipe 23 entering the receptacle 1 through the wall 22 closer to the axle 13 than is the wall 7, and what constitutes the upper end of the pipe 23 when the receptacle 17 is uppermost is ordinarily closed by a cap 24 on the removal of which the tank 1 may receive a supply of gasolene, and after it is filled the cap is replaced, thus preventing leakage or evaporation.

Extending through the wall 22 at any convenient point and close to the wall 7, is a nipple 25 carrying a valve 26 which valve may be a gate valve controlled by a lever 27. Connected to the nipple 25 is a pipe 28 containing a check valve 29 and extending through the wall of the tank 1 close to what constitutes the bottom of the tank when the latter is in the normal upright position. The pipe 28 constitutes a vent for the receptacle 17, the check valve 29 closing when the tank is upright and opening when the tank is inverted, so that on the inversion of the tank gasolene is directed into the passage 16 in part by the wall 11, and flows through the return portion of the passage about the corresponding end of the wall 8 into the receptacle 17, air or gas within the receptacle escaping through the then open check valve 29 and pipe 28 to the then upper end of the tank 1, so that there is no interference with the ready flow of the gasolene into the receptacle 17 until the latter is filled. On the return of the tank to the normal upright position the check valve 29 automatically closes and as the return end of the passage 16 is then uppermost the gasolene is imprisoned within the receptacle 17 and cannot flow therefrom except by way of the valve 26, which latter is supplied with an outflow pipe 29$^a$. This outflow pipe may be a flexible pipe of sufficient length and size to be readily introduced into the filling opening of a gasolene reservoir, and gasolene will then gravitate into the automobile reservoir on the opening of the valve 26.

In order that subatmospheric conditions within the receptacle 17 may be avoided, the top 6 is supplied with an air inlet valve 30 controlled by a rock arm 31 connected by a link 32 to the manipulating lever 27, so that on the opening of the valve 26 by an appropriate movement of the lever 27 the valve 30 is opened, whereby air readily flows into the receptacle 17 as gasolene flows therefrom through the valve 26 and pipe 29$^a$. When the valve 26 is closed the air inlet valve 30 is likewise closed and leakage and evaporation are thereby avoided. In order to readily rock the tank 1 upon its supporting axle 13, handles 33 are made fast to and project from the tank 1 and other parts wherever deemed necessary.

In order to provide for the ready transportation of the tank 1 where it is desired that the latter be made portable, a suitable truck is supplied. This truck comprises wheels 34 mounted on stub axles 35 each carried by a respective leg 36 of a yoke frame 37, the yoke frame having the legs 36 provided with an out-of-line bend 38, so that the axles 35 are in a different vertical plane from the axle 13, thus bringing the center of gravity of the device to one side of the vertical plane of the axes of the wheels 34.

Fast to each leg 36 of the frame 37 is an inclined bar 39 terminating at one end in a handle 40 and at the other end carrying one end of an axle or rod 41, this latter axle or rod having small wheels or rollers 42 mounted thereon close to the respective bars 39, these bars extending to both sides of the legs 36 of the frame 37. Made fast at respective ends to corresponding ends of the rod or axle 41 are other bars 43 each appropriately bent and connected at an intermediate point to the frame 37 close to the junction of the legs 36 therewith. That end of each bar 43 remote from the rollers 42 is made fast to one end of another bar 44 continued through and made fast at an intermediate point to a corresponding bar 39, and from thence extended to the corresponding leg 36 at a point higher than the bend 38.

The frame 37 with the bars 39, 43 and 44 are representative of any suitable truck frame and the truck support is not to be considered as necessarily limited to the exact construction indicated, but may be quite widely varied in construction so long as the purposes of the invention are provided for thereby.

The upper ends of the legs 36 receive the axle 13 which may be riveted or otherwise made fast at its ends to the corresponding ends of the legs 36, or may be secured thereto in any suitable manner.

Fast at one end to one of the legs 36 at an appropriate distance below the upper end of the leg is a latch bar 45, this bar being shown as made fast to the leg by a clip 46, but any other means may be employed for the purpose. Near the upper end of the leg 36 under consideration there is provided another clip 47 guiding the latch bar 45 but permitting a limited movement thereof from the corresponding leg 36. This latch bar is traversed by a bolt 48 on which there is mounted a spring 49 tending constantly to hold the latch bar against the corresponding leg 36, but allowing a limited movement of the latch bar away from the leg. Fast to the side wall 3 of the tank 1 is a keeper 50 into which the corresponding end of the latch bar may enter, this keeper being provided with a notch and inclined approaches which readily move the latch against the action of the spring 49 and permit it to snap into the holding notch when the tank is in the upright position, thus preventing rotary movements of the tank so long as the latch is lodged in the keeper. A handle 51 at the upper end of the latch 45 provides a convenient means for the manipulation of the latch.

The tank 1 is mounted high enough above the yoke portion of the frame 37 to permit the desired rotary movements for the filling of the receptacle 17, and this brings the tank to an appropriate height to carry the valve 26 well above the storage reservoirs of many types of automobiles.

The device is readily moved from place to place by grasping the handles 40 and lifting the supporting ends of the legs 44 off the floor or other surface upon which the truck is run, the rollers 42 merely serving as means for preventing a rocking of the structure to an extent to overbalance it at the end provided with the rollers 42.

The invention may be arranged in such manner as to include a plurality of tanks 1 upon a single truck, so that the tanks may be supplied with gasolene, lubricating oils or other commodities, whereby a single structure may be utilized for the transportation of various liquids whether for use in automobiles or in other connections.

The device is useful in repair shops, or wherever it is desired to supply liquids, especially in measured quantities, and while the tank 1 is shown as mounted upon a truck it is to be understood that it need not of necessity be so mounted, but may be mounted upon stationary supports when portability is of no moment.

In Fig. 7 a multiple arrangement is indicated, and while in the figure no attempt is made to show any minutia of structure, it is to be understood that the structure is similar to that shown in the other figures and the details of the construction are omitted merely to avoid confusion of illustration.

The receptacle 17 is arranged to one side of what would constitute the periphery of the main tank 1 if the tank be considered as wholly cylindrical, and the receptacle is so constructed that when the receptacle is filled and the tank is returned to its normal position, the receptacle is centralized above the axis of rotation of the tank 1, which axis of rotation is, because of the eccentric relation of the main body of the tank thereto, above the center of gravity of said main body of the tank. It follows, therefore, that the center of gravity of the tank is low and even a comparatively small amount of gasolene in the main tank will overbalance that in the receptacle 17 even though the latter be full. The tank 1 is balanced no matter how much gasolene may be in the receptacle, or how much may be drawn therefrom. The receptacle 17 may be wholly emptied of gasolene without in any manner unbalancing the tank 1, wherefore the structure is always steady under all conditions of use.

What is claimed is:—

1. A rotatable storage tank for liquids having its axis of rotation eccentric to the center of the main body of the tank and provided with a receptacle extending from the main body of the tank on the same side of the center of the latter as the axis of rotation, said receptacle communicating with the body of the tank for the filling of the receptacle by the movement of the latter to a low point, and said tank having means for locking it with the receptacle substantially centralized over the axis of rotation of the tank.

2. A rotatable storage tank for liquids having its axis of rotation eccentric to the center of the main body of the tank and provided with a receptacle extending from the main body of the tank on the same side of the center of the latter as the axis of rotation, said receptacle communicating with the body of the tank for the filling of the receptacle by the movement of the latter to a low point, and said tank having means for locking it with the receptacle substantially centralized over the axis of rotation of the tank, said receptacle and tank having means of communication including a check valve opening toward the tank, and said means of communication connecting with the receptacle and tank at points constituting low points thereof when the tank is in the normal upright position.

3. A rotatable storage tank for liquids provided with a measuring receptacle at one side of its axis of rotation with means of communication between the body of the tank and the receptacle for filling the latter when below the axis of rotation, and said receptacle being movable to a point above the main body of the tank, an outlet for liquid from the receptacle communicating therewith at a point constituting a low point in the receptacle when above the main body of the tank, a valve in said outlet provided with a manipulating member, an air inlet valve on the receptacle, and connections between the manipulating member and the air inlet valve for causing simultaneous movements of both valves, the first-named valve being permanently located in the outlet of the receptacle.

4. In combination with a support, a rotatable storage tank for liquids, comprising a main body, means for pivoting the body of the tank to the support eccentrically to the center of said body, the latter being provided with a receptacle formed by a continuation of the walls of the main body of the tank on the same side of the center of the latter as the axis of rotation, said receptacle having an inlet communicating with the body of the tank at one end of the receptacle to allow for the filling of the latter by the movement to a low point, and means provided on the support for locking the tank with the receptacle substantially centralized over the axis of rotation of the tank, whereby when the receptacle is in an upright position and full it does not unbalance the tank, and an outlet for drawing the liquid from the receptacle.

5. A rotatable storage tank for liquids, of substantially cylindrical form with a radially disposed continuation having walls within the tank defining a receptacle in said continuation and also defining a tortuous passage between the main body of the tank and said continuation, the passage extending from the tank along one end of the continuation and entering the latter by a return bend at a point remote from the main body of the tank through that portion of the continuation forming the top thereof in the normal position of the storage tank.

6. A rotatable storage tank for liquids of substantially cylindrical form with a radially disposed continuation having walls within the tank defining a receptacle in said continuation and also defining a tortuous passage between the main body of the tank and said continuation entering the latter by a return bend at a point remote from the main body of the tank, and said main body of the tank having another wall within it extending from a point closely adjacent to its axis of rotation to the passage leading to the receptacle to direct liquid to said passage when the tank is rocked on its axis to lower the said receptacle.

7. A rotatable storage tank for liquids of substantially cylindrical form with a radially disposed continuation having walls within the tank defining a receptacle in said continuation and also defining a tortuous passage between the main body of the tank and said continuation entering the latter by a return bend at a point remote from the main body of the tank, and said main body of the tank having another wall within it extending from a point closely adjacent to its axis of rotation to the passage leading to the receptacle to direct liquid to said passage when the tank is rocked on its axis to lower the said receptacle, said receptacle having a pipe leading therefrom to a point within the main body of the tank and terminating near that portion of the main body of the tank remote from the receptacle, said pipe containing a check valve closing toward the receptacle.

8. A rotatable storage tank for liquids of substantially cylindrical form with a radially disposed continuation having walls within the tank defining a receptacle in said continuation and also defining a tortuous passage between the main body of the tank, and said continuation entering the latter by a return bend at a point remote from the main body of the tank, and said main body of the tank having another wall within it extending from a point closely adjacent to its axis of rotation to the passage leading to the receptacle to direct liquid to said passage when the tank is rocked on its axis to lower the said receptacle, said receptacle having a pipe leading therefrom to a point within the main body of the tank and terminating near that portion of the main body of the tank remote from the receptacle, said pipe containing a check valve closing toward the receptacle, and said receptacle being also provided with an outlet having a valve therein with accessible manipulating means, and a valved air inlet connected to the manipulating means of the outlet valve for the simultaneous opening or closing of both on the operation of the manipulating means.

9. A substantially cylindrical rotatable tank for liquids having its axis of rotation eccentric to the axis of generation of the tank and said tank having a radially offset portion with its walls within the main body of the tank defining a measuring receptacle in said offset portion, said tank being provided with a tortuous passage leading from the main body of the tank into the receptacle at a point remote from the main body of the tank, other means of communication between the receptacle and main body of the tank leading from a portion of the receptacle close to the main body of the tank and opening into the latter on the side of the axis of rotation remote from the receptacle, said means of communication including a check valve closing toward the main body of the tank, and said receptacle being provided with means for the withdrawal of liquid therefrom and the entrance of air thereinto.

10. A portable tank for liquids provided with a truck having supporting wheels and supporting legs with the tank having its center of support between the axis of the wheels and the supporting legs, said tank being of substantially cylindrical contour and rockable upon a substantially horizontal axis eccentric to the axis of generation of the tank and said tank having a laterally offset measuring receptacle freely communicating with the body of the tank at a point remote from the latter for the filling of the receptacle by a rocking movement of the tank, and said receptacle having means for the withdrawal of liquid therefrom.

11. A portable tank for liquids provided with a truck having supporting wheels and supporting legs with the tank having its center of support between the axis of the wheels and the supporting legs, and said tank being rockable upon a substantially horizontal axis, the tank having a laterally offset measuring receptacle freely communicating with the tank at a point remote from the main body of the tank for the filling of the receptacle by a rocking movement of the tank, and said tank having means for the withdrawal of liquid therefrom.

12. A portable tank for liquids provided with a truck having supporting wheels and supporting legs with the tank having its center of support above the axis of the wheels and between the latter and the supporting legs, said tank being of approximately cylindrical contour and rockable upon a substantially horizontal axis eccentric to the axis of generation of the tank and also said tank having a laterally offset measuring receptacle freely communicating with the body of the tank at a point remote from the body for filling the receptacle by a rocking movement of the tank, and said receptacle having means for the withdrawal of liquid therefrom.

In testimony, that I claim the foregoing as my own, I have hereto affixed my signature in the presence of two witnesses.

EDGAR J. BRYAN.

Witnesses:
T. F. FLAHERTY,
CHAS. J. RUCKHOFF.

Copies of this patent may be obtained for five cents each, by addressing the "Commissioner of Patents, Washington, D. C."